(No Model.) 3 Sheets—Sheet 1.
J. I. BOSWELL.
COMBINED SEED PLANTER AND FERTILIZER DISTRIBUTER.
No. 336,285. Patented Feb. 16, 1886.
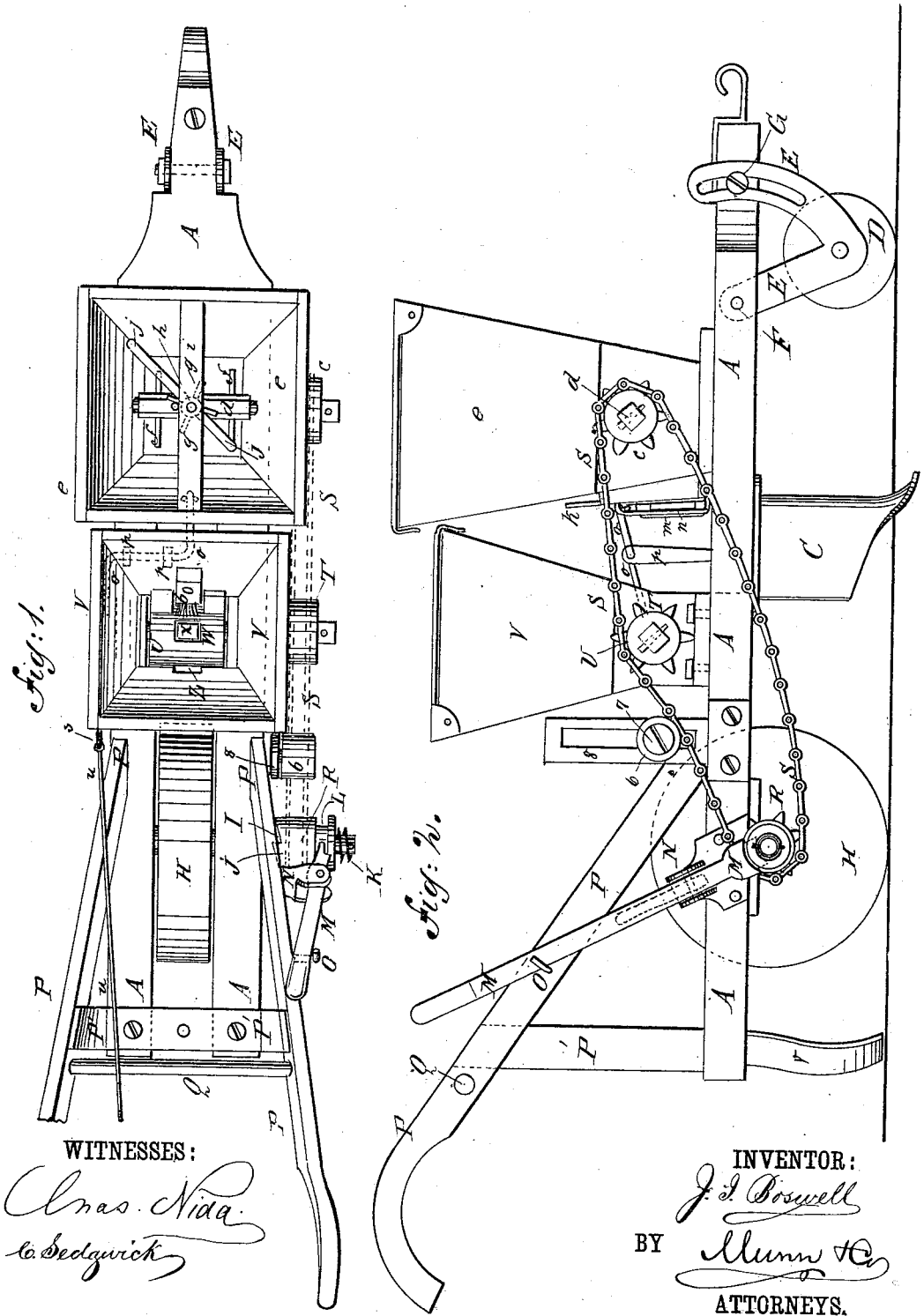
WITNESSES:
Chas. Nida
C. Sedgwick
INVENTOR:
J. I. Boswell
BY Munn & Co
ATTORNEYS.

(No Model.) 3 Sheets—Sheet 2.

J. I. BOSWELL.
COMBINED SEED PLANTER AND FERTILIZER DISTRIBUTER.

No. 336,285. Patented Feb. 16, 1886.

WITNESSES:
Chas. Nida
C. Sedgwick

INVENTOR:
J. I. Boswell
BY Munn & Co.
ATTORNEYS.

(No Model.)  3 Sheets—Sheet 3.
J. I. BOSWELL.
COMBINED SEED PLANTER AND FERTILIZER DISTRIBUTER.
No. 336,285. Patented Feb. 16, 1886.
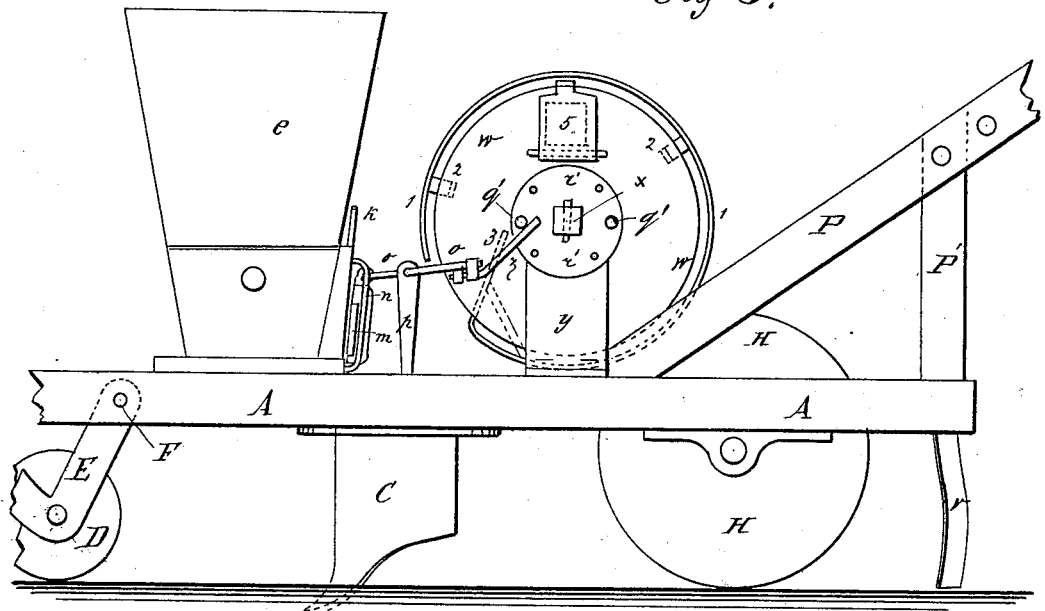
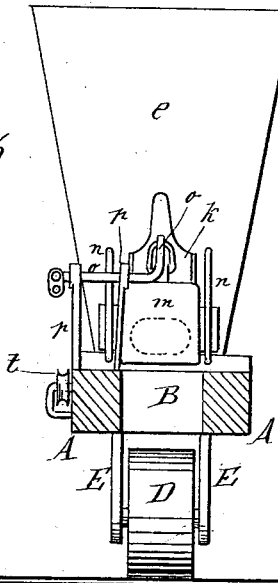
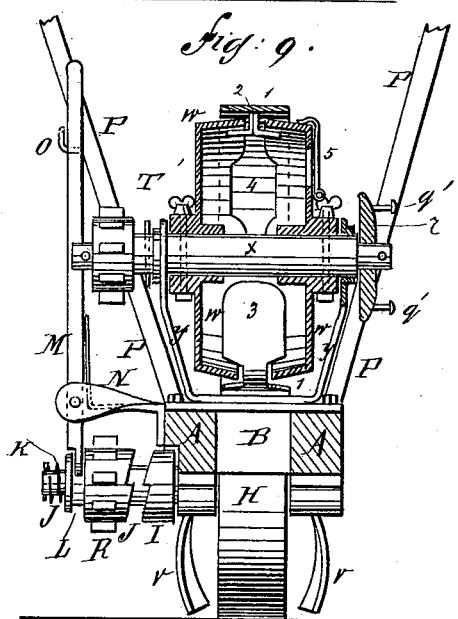
WITNESSES:
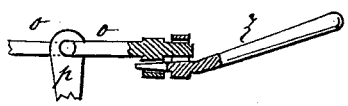
INVENTOR:
J. I. Boswell
BY Munn & Co.
ATTORNEYS.

UNITED STATES PATENT OFFICE.

JOHN IVERSON BOSWELL, OF NEAR CHASE CITY, VIRGINIA.

COMBINED SEED-PLANTER AND FERTILIZER-DISTRIBUTER.

SPECIFICATION forming part of Letters Patent No. 336,285, dated February 16, 1886.

Application filed August 14, 1885. Serial No. 174,408. (No model.)

*To all whom it may concern:*

Be it known that I, JOHN IVERSON BOSWELL, near Chase City, in the county of Mecklenburg and State of Virginia, have invented a certain new and useful Improvement in a Combined Seed-Planter and Fertilizer-Distributer, of which the following is a full, clear, and exact description.

Reference is to be had to the accompanying drawings, forming part of this specification, in which similar letters of reference indicate corresponding parts in all the figures.

Figure 3:
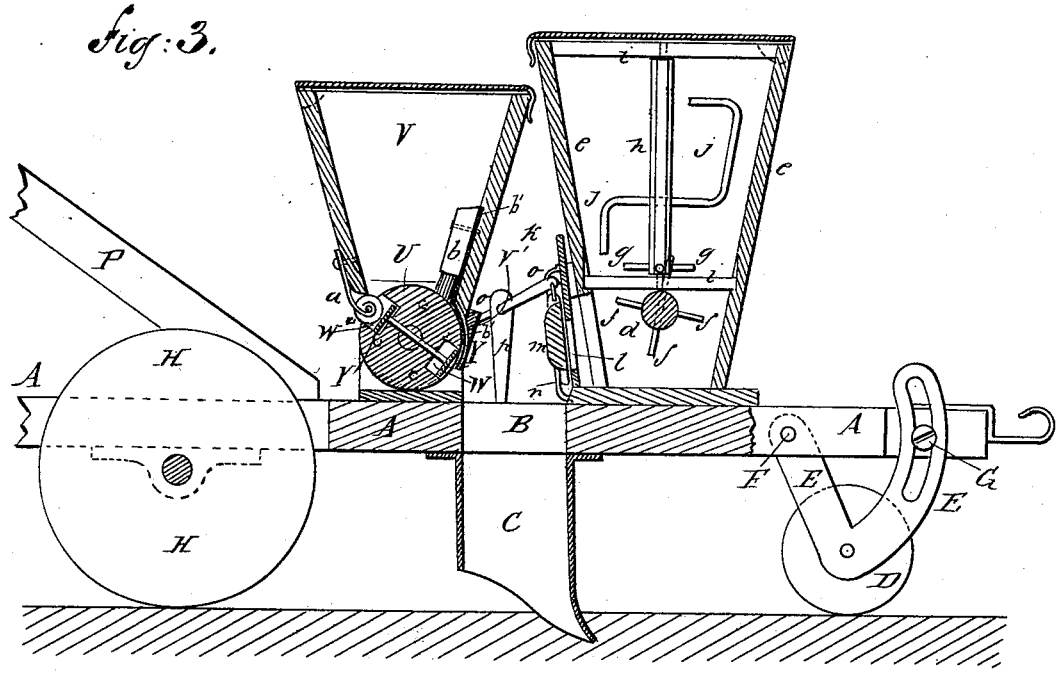
Figure 4:
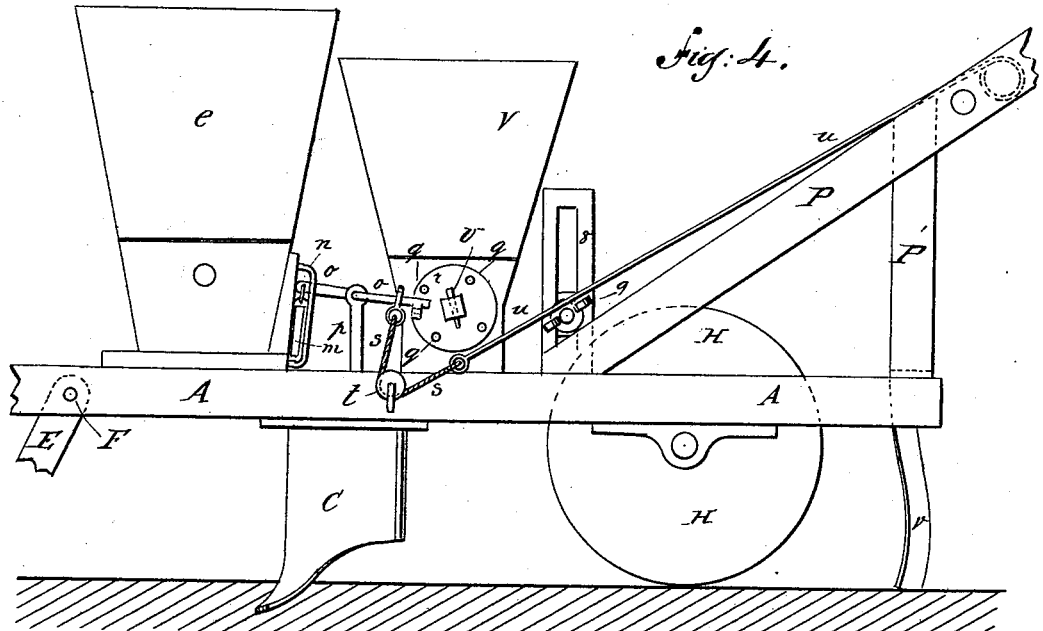

Figure 1 is a plan view of one of my improved seed-planters and fertilizer-distributers. Fig. 2 is a side elevation of the same. Fig. 3 is a side elevation of the same, partly in section, and parts being broken away. Fig. 4 is a side elevation of the same, showing the reverse side from that shown in Fig. 2. Fig. 5 is a side elevation of the same, shown as arranged for cotton-seed. Fig. 6 is a sectional end elevation of the same, showing the fertilizer-gate and the mechanism for operating it. Fig. 7 is an elevation of a fertilizer gage-plate. Fig. 8 is an elevation of the crank-shaft and its support and extension, partly in section, and parts being broken away. Fig. 9 is a sectional end elevation of the machine, arranged for cotton-seed, taken through the cotton-seed drum.

The object of this invention is to provide combined seed-planters and fertilizer-distributers constructed in such a manner as to drop the seed at uniform distances apart, and which may be arranged to drop the fertilizer either with the seed or before and after it, or in continuous drill.

The invention consists in the construction and combination of various parts of the machine, as will be hereinafter fully described and then claimed.

A represents the beam or bed-plate of the machine. In the middle part of the beam or bed-plate A is formed an opening, B, through which the seed and fertilizer are discharged. To the lower side of the beam A and around the lower end of the opening B is attached the upper end of the opening-plow C, so that the seed and fertilizer will be guided into the bottom of the furrow opened by the said plow.

The forward end of the machine is supported, lumps and clods in front of the opening-plow C are crushed, and the depth to which the said plow enters the ground is gaged by the small wide-rimmed wheel D, which is journaled to the angles of two V-shaped brackets, E. The rear arms of the brackets E are straight, and their upper ends are inserted in short slots in the forward side parts of the beam A, and are pivoted to the said beam by a pin or bolt, F, passing through the said ends and beam. The forward arms of the brackets E are curved in the arcs of circles, having their centers in the pin or bolt F, and have curved slots formed in them longitudinally to receive the bolt G, which also passes through the forward end of the beam A, so that by loosening the said bolt G, the said brackets can be swung upon the pivoting pins or bolts F, to raise or lower the wheel D, and thus regulate the depth to which the plow C enters the ground.

The rear end of the machine is supported by the large wide-rimmed wheel H, placed in a slot in the central rear part of the beam and journaled in bearings attached to the lower side of the said part. The wheel H forces the soil into the furrow, covers the seed and the fertilizer, smooths off the top of the row, and serves as a drive-wheel to give motion to the operating parts of the machine. One of the journals of the drive-wheel H projects, and to it at a little distance from its outer end is attached the stationary part I of a clutch, the movable part J of which slides upon the outer end of the said journal, and is held in gear with the said stationary part I by a spiral spring, K, placed upon the said journal, or by a leaf-spring bearing against the clutch-lever and attached to the clutch-lever support, as indicated in dotted lines in Figs. 2 and 9. Upon the outer end of the movable part J of the clutch is formed an annular groove, L, in which rides the forked lower end of the lever M. The clutch-lever M is fulcrumed to a support, N, attached to the beam A, and its upper end projects into such a position that it can be readily reached and operated by the plowman. The lever M is held in place, when holding the movable part of the clutch out of gear with the stationary part, by a catch, O, attached to the handle P. The lower ends of the handles P are attached to the beam A, and their upper parts are connected by a round, Q, and are supported at the proper elevation by the braces P'. Upon the movable part J of the clutch is formed or with it is rigidly connected a chain-wheel, R, around which passes an endless chain, S. The endless chain S also passes around a chain-wheel, T, attached to a journal of the seed-dropping cylinder U, which is placed in the lower part of the seed-hopper V, attached at its bottom to the beam A at the rear side of the opening B. The seed-dropping cylinder U is journaled to the lower part of the sides of the hopper V, and in its opposite sides are formed recesses W, of such a size as to hold enough seed for a hill.

The seed-dropping cylinder U is perforated transversely, and in the said perforation is placed a rod, X, to the ends of which are attached plates Y, of such a shape and size as to fit into the recesses W. The rod X is made of such a length that when one of the plates Y is at the bottom of a recess W the other plate Y will be at the mouth of the other recess W, and flush with the surface of the seed-dropping cylinder U. In an opening in the rear side of the hopper V, and directly opposite the center of the seed-dropping cylinder U, is placed a roller, Z, a little smaller than the recesses W, and held against the face of the said cylinder U by the spring $a$, to the lower end of which the said roller Z is pivoted, and which is attached at its upper end to the rear side of the hopper V. With this construction, when the rod X comes into an oblique position, and the forward recess passes from beneath an apron-extension, V', of front side of hopper V, the roller Z will rest against the rear plate Y, and will force the rod and its plates forward and cause the forward plate Y to push the seed out of the forward recess W, so that it will drop through the aperture B and the plow C to the ground. The cylinder U is kept from carrying out any more seed than is contained in the recess W by a brush, $b$, attached to the lower part of the inner surface of the forward side of the hopper V, and which rests against the face of the said cylinder.

To prevent the seed from falling out of the recesses of the cylinder and being crushed between the edges of the said recesses and the hopper after passing the brush $a$, spring $b'$ is secured in a recess in the hopper in rear of the brush, and extends to or a little below the lower edge of the apron-extension V' of the hopper, as shown in Fig. 3.

The endless chain S also passes around a chain-wheel, $c$, attached to the journal of a shaft, $d$, which passes through the lower parts of the sides of the fertilizer-hopper $e$, attached to the beam A at the forward side of the opening B, as shown in Fig. 3. To the shaft $d$ are attached radial pins $f$, which, as the said shaft $d$ is revolved, agitate the fertilizer in the lower part of the hopper $e$, and feeds it out through the discharge-opening in the lower part of the rear side of the said hopper $e$. The central pins, $f$, engage with radial pins $g$, attached to the lower part of the vertical shaft $h$, so that the said shaft $h$ will be revolved by the revolution of the shaft $d$. The journals of the vertical shaft $h$ revolve in bearings in cross-bars $i$, attached to the lower and upper parts of the hopper $e$. To the vertical shaft $h$ is attached a bent rod, $j$, which, as the said shaft is revolved, keeps the fertilizer in the upper part of the hopper $e$ stirred up, so that it will pass down freely into the lower part of the said hopper to take the place of the fertilizer discharged by the pins $f$. The amount of fertilizer discharged is regulated by a series of gage-plates, $k$, the edges of which are beveled and slide in grooved cleats or other suitable ways, attached to or formed upon the rear side of the hopper $e$. In the plate $k$ is formed a hole, $l$, through which the fertilizer escapes. The machine is made to discharge more or less fertilizer by removing the plate $k$ and replacing it with another plate having a larger or a smaller discharge-aperture.

The discharge of the fertilizer is cut off or stopped by a gate, $m$, the ends of which are reduced in size and slide up and down in staples $n$, or other keepers, attached to the rear side of the hopper $e$, and which is made sufficiently heavy to cause it to close by its own weight.

To the upper end of the gate $m$ is connected by a link or other suitable means the end of the forward arm of the crank-shaft $o$. The crank-shaft $o$ rocks in bearings in standards $p$, attached to the beam A, between the two hoppers V $e$. The end of the rear arm of the crank-shaft $o$ projects into such a position at the side of the hopper V as to be struck by pins $q$, attached to the outer side of a small wheel, $r$, attached to the projecting journal of the seed-dropping cylinder U. When the fertilizer is to be dropped in the same place with the seed, only two pins, $q'$, are used, as indicated in Fig. 5; but when the fertilizer is to be dropped before and after the seed, four pins $q$ are used, as shown in Fig. 4, and indicated by the four equidistant pin-holes in Fig. 5.

In case the fertilizer-dropper be used without the seed-hopper V, the end of a short cord or chain, $s$, is connected with the rear arm of the crank-shaft $o$ by a hook or other suitable means. The cord or chain $s$ is passed around a guide-pulley, $t$, pivoted to a support attached to the beam A, and to its other end is attached the end of the rod $u$, which extends up along the handle P into such a position that it can be conveniently reached and operated by the plowman to raise the gate $m$ and allow the fertilizer to drop.

When required, the seed and fertilizer can be further covered by curved coverers $v$, attached to the frame A in the rear of the drive-wheel H, as shown in Figs. 2, 4, 5, and 9.

In case cotton-seed or broom-corn is to be planted, the rear or seed hopper, V, is detached and replaced by a drum, $w$, attached to an axle, $x$, the journals of which revolve in bearings in standards y, attached to the beam A a little in the rear of the place where the said hopper V was placed. The axle x is provided at one end with a chain-wheel, T', in the same manner as the seed-dropping cylinder U, and at the other end with a wheel, r', provided with two or four pins q'; but in this case the endless chain S must be lengthened somewhat, and the rear arm of the crank-shaft o must have an extension, z, coupled to it, as shown in Figs. 5 and 8.

The drum w is made in two parts in the form of short hollow cylinders, open at one end, and which are secured to the axle x, with their open ends toward each other and at a little distance apart.

Around the drum w is placed an open band, 1, of sufficient width to cover the space between the two halves of drum, however adjusted, the ends of which do not quite meet, the space between the said ends being at the lower forward part of the drum, as shown in Fig. 5, so as to be over the opening B. The open band 1 is held stationary by being attached to the beam A or standards y, and is kept in place upon the drum w by T-lugs 2, attached to the said band, and which pass through the slot of the said drum. The lower end, 3, of the open band 1 is bent inward, has a neck formed upon it to pass through the slot of the drum w, is widened, inclined forward, and slightly concaved, and is strengthened in position by an inclined brace, (shown in dotted lines in Fig. 5,) so that the said end 3 will serve as an apron to receive the seed. In the opposite sides of the drum w are correspondingly-widened spaces 4, so that when either of the said spaces comes opposite the end 3, the seed upon the said end will pass out through the said space and drop through the opening B to the ground.

When the seed is to be drilled, the two halves of the drum are separated far enough for the seed to pass out at any part of the space between the halves of the drum as it revolves past the space between the ends of band 1. Seed is introduced into the drum w through an opening in one of its sides, which opening is closed by a door, 5, as shown in Figs. 5 and 9.

The tension of the endless chain S is regulated by a pulley, 6, the journal 7 of which passes through a vertical slot in the standard 8, attached to the beam A, and is secured in place when adjusted by a hand-nut, 9, screwed upon its rear end.

The two halves of the drum have in the centers of their closed ends hubs extending inward and outward far enough to make them steady on the axle. Through the outer ends of these hubs are formed bolt-holes, which range with slots formed lengthwise in the axle x. Through the bolt-holes in the hubs and through the slots in the axle are placed bolts with thumb-nuts, which bolts serve the double purpose of fastening the drum to the axle and as set-screws to fix the two halves of the drum at any desired distance apart for either dropping or drilling seed.

The seed and fertilizer hoppers can be made with one or more of their sides in sections, as indicated in Figs. 4 and 5, so as to facilitate placing the shafts in position or changing cylinders for others with different-size recesses for planting different kinds of seed.

The drum herein shown and described for planting cotton-seed or broom-corn, and the devices in the fertilizer-hopper for agitating the fertilizer form no part of the present invention; but I reserve to myself the right to make separate applications therefor at some future time.

Having thus fully described my invention, I claim as new and desire to secure by Letters Patent—

1. In a combined seed-planter and fertilizer-distributer, the combination, with the beam A, the adjustable gage-wheel and its bracket D E, the drive-wheel H, and the two hoppers V e, of the chain-wheels R T c, the endless chain S, the seed-dropping cylinder U, and the agitator d f g h j, substantially as herein shown and described.

2. In a combined seed-planter and fertilizer-distributer, the combination, with the hopper V and the seed-dropping cylinder U, having seed-receiving recesses W in its opposite sides, of the sliding rod X, the plates Y, attached to the ends of the said rod, and the roller and spring Z a, substantially as herein shown and described, whereby the seed will be discharged with certainty at the proper time, as set forth.

3. In a combined seed-planter and fertilizer-distributer, the combination, with the hopper e, the hopper V, and the seed-dropping cylinder U, of the vertically-sliding gate m, the crank-shaft o, and the wheel r, having pins q, substantially as herein shown and described, whereby the said gate will be opened to discharge the fertilizer by the revolution of the said seed-dropping cylinder, as set forth.

4. In a seed-planter and fertilizer-distributer, the combination, with a seed-hopper, a seed-cylinder therein, and a fertilizer-hopper, of a gate for closing an opening in the fertilizer-hopper, and intermediate mechanism for operating the said gate from the seed-cylinder, substantially as herein shown and described.

JOHN IVERSON BOSWELL.

Witnesses:
F. B. ROBERTS,
T. E. ROBERTS.